US012282161B2

(12) United States Patent
Pankratz et al.

(10) Patent No.: US 12,282,161 B2
(45) Date of Patent: Apr. 22, 2025

(54) STANDARDIZED WEDGE PROFILE IN GLASS LAMINATE FOR GHOST REDUCTION

(71) Applicant: 3M INNOVATIVE PROPERTIES COMPANY, St. Paul, MN (US)

(72) Inventors: Stephan J. Pankratz, Eagan, MN (US); William F. Edmonds, Chavannes-des-Bois (CH); Matthew B. Johnson, Woodbury, MN (US); John F. VanDerlofske, III, Minneapolis, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 541 days.

(21) Appl. No.: 17/770,778

(22) PCT Filed: Nov. 13, 2020

(86) PCT No.: PCT/IB2020/060709
§ 371 (c)(1),
(2) Date: Apr. 21, 2022

(87) PCT Pub. No.: WO2021/099905
PCT Pub. Date: May 27, 2021

(65) Prior Publication Data
US 2022/0413286 A1 Dec. 29, 2022

Related U.S. Application Data

(60) Provisional application No. 62/937,353, filed on Nov. 19, 2019.

(51) Int. Cl.
*G02B 27/01* (2006.01)
*B60K 35/00* (2006.01)
(Continued)

(52) U.S. Cl.
CPC .......... *G02B 27/0101* (2013.01); *B60K 35/00* (2013.01); *G02B 5/3066* (2013.01);
(Continued)

(58) Field of Classification Search
CPC .. G02B 27/0018; G02B 27/01; G02B 27/017; G02B 27/0101; G02B 27/0176;
(Continued)

(56) References Cited

U.S. PATENT DOCUMENTS

2013/0182302 A1* 7/2013 Shikii ................. H04N 9/3161
359/13
2017/0343806 A1 11/2017 Anzai et al.
(Continued)

FOREIGN PATENT DOCUMENTS

EP 0420228 A2 3/1995
JP H02279437 A 11/1990
(Continued)

OTHER PUBLICATIONS

International Search Report for PCT International Application No. PCT/IB2020/060709, mailed on Apr. 15, 2021, 4 pages.

*Primary Examiner* — Sultan Chowdhury
(74) *Attorney, Agent, or Firm* — Jonathan L. Tolstedt

(57) ABSTRACT

A heads-up display includes a windshield with a standardized wedge profile and an embedded reflective polarizer and a display. The reflective polarizer is disposed between, and spaced apart from, opposing outermost first and second major glass surfaces of the windshield. The heads-up display forms a virtual image for viewing by the eye of a passenger. An image emitted by the display may include a first image ray emitted from a predetermined region of the display and incident on the outermost first major glass surface of the windshield at an angle of incidence greater than about 60 degrees, with at least 90% of the incident first emitted image
(Continued)

ray polarized in a plane of incidence of the first emitted image ray.

17 Claims, 6 Drawing Sheets

(51) Int. Cl.
  *G02B 5/30*   (2006.01)
  *G02B 27/00*  (2006.01)
  *B60K 35/23*  (2024.01)
  *B60K 35/60*  (2024.01)
(52) U.S. Cl.
  CPC .......... *G02B 27/0018* (2013.01); *B60K 35/23* (2024.01); *B60K 35/60* (2024.01); *B60K 2360/785* (2024.01); *G02B 2027/0121* (2013.01); *G02B 2027/0196* (2013.01)
(58) Field of Classification Search
  CPC ... G02B 5/00; G02B 5/26; G02B 5/30; G02B 5/3066; G02B 5/3083; G02B 2027/013; G02B 2027/0118; G02B 2027/0121; G02B 2027/0196; B60K 35/00; B60K 35/23; B60K 35/60; B60K 35/213; B60K 2360/31; B60K 2360/77; B60K 2360/334; B60K 2360/785; B32B 17/10036; B32B 17/10293; B32B 17/10458; B32B 17/10568
  See application file for complete search history.

(56) References Cited

U.S. PATENT DOCUMENTS

| | | |
|---|---|---|
| 2017/0357088 A1 | 12/2017 | Matsuzaki |
| 2018/0284430 A1 | 10/2018 | Chen |
| 2019/0129172 A1* | 5/2019 | Misawa .................. B60K 35/00 |
| 2019/0227308 A1* | 7/2019 | Yokoe ................ G02B 27/0101 |

FOREIGN PATENT DOCUMENTS

| | | |
|---|---|---|
| WO | 2005017600 A1 | 2/2005 |
| WO | 2019057477 A1 | 3/2019 |
| WO | 2019179682 A1 | 9/2019 |

* cited by examiner

STANDARDIZED WEDGE PROFILE IN GLASS LAMINATE FOR GHOST REDUCTION

CROSS REFERENCE TO RELATED APPLICATIONS

This application is a national stage filing under 35 U.S.C. 371 of PCT/IB2020/060709 filed Nov. 13, 2020, which claims the benefit of Provisional Application No. 62/937,353, filed Nov. 19, 2019, the disclosure of which are incorporated by reference in their entirety herein.

SUMMARY

In some aspects of the present description, a heads-up display for viewing by an eye of a passenger of a vehicle is provided, including a windshield and a display. In some embodiments, the windshield includes a reflective polarizer disposed between, and spaced apart from, opposing outermost first and second major glass surfaces of the windshield, such that for substantially normally incident light and for at least a first wavelength in a visible wavelength range extending from about 420 nm to about 680 nm, the reflective polarizer reflects at least 15% of the incident light having a first polarization state, and transmits at least 60% of the incident light having an orthogonal second polarization state. In some embodiments, the display includes an active display region with a maximum lateral dimension, D, which is configured to emit an image. The heads-up display forms a virtual image of the emitted image for viewing by the eye of the passenger. In some embodiments, a separation between the virtual image and the eye of the passenger may be at least 2 meters. In some embodiments, the active display region has a display center and a predetermined region which includes the display center, such that the predetermined region has a largest lateral dimension d, such that the ratio d/D is less than or equal to about 0.25. In some embodiments, the windshield may be configured to receive the image emitted by the active display region and reflect at least a portion of the received image toward the eye of the passenger. For at least one first location within the predetermined region of the active display region, the emitted image may include a first emitted image ray emitted from the first location and incident on the outermost first major glass surface of the windshield at an angle of incidence greater than about 60 degrees with at least 90% of the incident first emitted image ray polarized in a plane of incidence of the first emitted image ray.

In some aspects of the present description, a windshield of a vehicle is provided, the windshield including a reflective polarizer disposed between, and bonded to, first and second glass segments. In some embodiments, the first and second glass segments have respective average thicknesses t1 and t2, such that t2 is greater than or equal to t1. In some embodiments, each of the first and second glass segments include opposing inner and outer glass interfaces, where the inner interfaces of the first and second glass segments face the reflective polarizer. In some embodiments, the outer glass interfaces of the first and second glass segments may face away from the reflective polarizer and make respective angles θ1 and θ2 with the reflective polarizer, where at least one of θ1 and θ2 have a value between about 0.0010 and about 0.0060 degrees.

In some aspects of the present description, a heads-up display for forming a virtual image for viewing by an eye of a passenger of a vehicle is provided, including a glass windshield and a display. In some embodiments, the glass windshield includes opposing outermost first and second glass interfaces, and a reflective polarizer embedded therein and spaced apart from the outermost first and second glass interfaces. For substantially normally incident light, and for at least a first wavelength in a visible wavelength range extending from about 420 nm to about 680 nm, the reflective polarizer reflects at least 15% of the incident light having a first polarization state, and transmits at least 60% of the incident light having an orthogonal, second polarization state. In some embodiments, the display may be positioned closer to the first glass interface and farther from the second glass interface, and may include an active display region configured to emit an image. In some embodiments, at least first and second emitted image rays, which are angularly spaced apart by a first angle and emitted in a same emission plane from a same location in the active display region, may be incident on the windshield in a same incident plane coincident with the emission plane at incident angles greater than about 60 degrees, and may be reflected by the windshield as at least respective first and second reflected image rays angularly spaced apart by a second angle, the first and second reflected image rays incident on the eye of the passenger with the second angle being less than the first angle by at least 20%.

In some aspects of the present description, an optical stack for use in a windshield of a vehicle is provided, including a reflective polarizer disposed between first and second polymeric films. In some embodiments, each of the first and second polymeric films may include a first major surface facing, and bonded to, the reflective polarizer, and an opposing second major surface facing away from the reflective polarizer, such that the second major surfaces of the first and second polymeric films make respective angles ω1 and ω2 with the reflective polarizer, where at least one of ω1 and ω2 having a value between about 0.0010 and about 0.0060 degrees.

In some aspects of the present description, a windshield for use in a heads-up display (HUD) of a vehicle is provided. When the windshield is assembled to the vehicle, the HUD is configured to form a virtual image of an image emitted by a display of the HUD for viewing by an eye of a passenger of the vehicle, with a separation between the virtual image and the eye of the passenger being between about 2 meters to about 16 meters, wherein for each image ray emitted from a central region of the display and incident on the windshield at an incident angle between about 64 degrees to about 70 degrees, the emitted image ray is reflected by outermost first and second surfaces of the windshield as respective first and second reflected image rays propagating toward the eye of the passenger and making an angle therebetween, such that an angle between the first and second surfaces is chosen so that the angle between first and second reflected image rays is less than about 0.04 degrees.

DETAILED DESCRIPTION

Figure 1A:
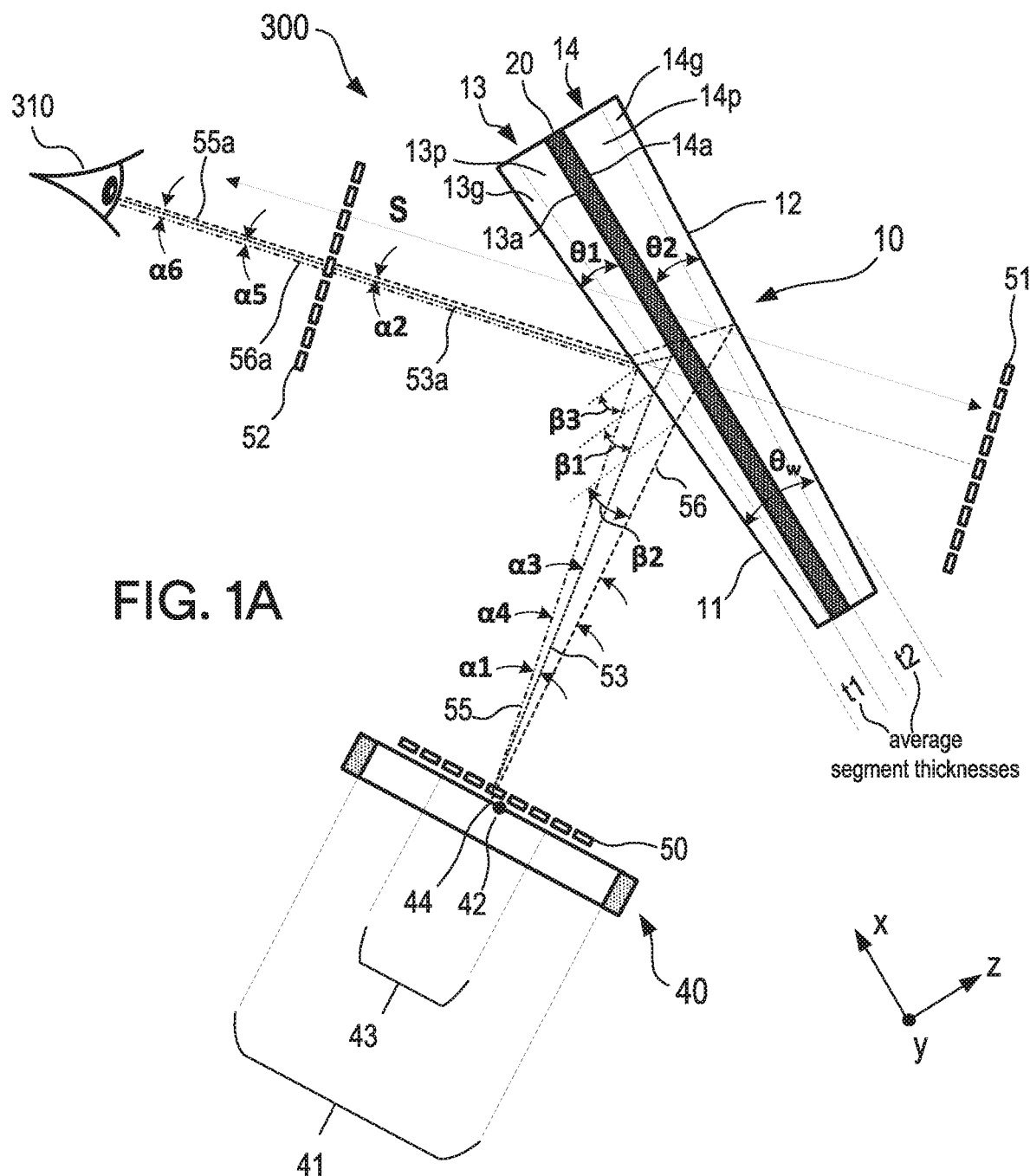
FIG. 1A is a cut-away, side view of a heads-up display, in accordance with an embodiment of the present description.

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

A common issue in a heads-up display (HUD) system in a vehicle is the appearance of ghost images created by reflections from both the inner and outer surface of the vehicle's windshield. That is, current HUD systems rely on the reflectivity of the glass-air interface of the windshield to project a virtual image that can be seen at some perceived distance in front of the eye of the viewer (e.g., the driver). Unfortunately, there are two glass-air interfaces for a windshield, one on the inside of the windshield (i.e., facing the driver) and one on the outside of the windshield. As the two outer surfaces (i.e., facing in and facing external to the vehicle) are separated by some distance (i.e., the thickness of the windshield), the reflected image rays from the inner glass-air interface and the outer glass-air interface are not aligned, creating a ghost image which reduces the clarity and perceived brightness of the intended virtual image.

One method of reducing the ghosting problem is through angular compensation, which is done by creating a wedge-shaped thickness profile for the windshield, which causes the front and back images to be reflected such that there is a significantly reduced angular displacement between them. However, this angular compensation approach requires a unique, customized thickness profile for each windshield design and/or orientation, depending on the windshield rake and skew angles. In addition, each unique thickness profile is designed to provide near "perfect" angular compensation for a limited range of view locations. That is, a thickness profile that works well for a tall driver may not work as well for a short driver, who has a different viewing angle (i.e., their eyes are lower because of their reduced height.)

A second method of reducing ghosting is through embedding a weak reflective polarizer between two pieces of glass (i.e., sandwiched between an inner and outer glass layers of the windshield), such that linear polarized light is reflected off the reflective polarizer. One such example of a reflective polarizer is 3M™ Windshield Combiner Film (3M™ WCF) manufactured by the 3M Corporation. When the reflective polarizer is used, image rays from the display are linear polarized (e.g., with a P polarization state, or P-pol image rays) and directed toward the windshield at an angle at or very near to Brewster's angle. Brewster's angle is that angle of incidence at which the P-pol light passes through the inner glass-air interface without reflection, impinges on the reflective polarizer, and at least a portion (e.g., 30%) of the P-pol light is reflected back toward the viewer as a single image (i.e., the only reflection of the image is from the reflective polarizer, and not the interior or exterior glass-air interface).

As the reflective polarizer is only a weak P-pol reflector, it allows for the use of HUDs that output P-polarized light that only weakly reflects off the windshield glass-air interfaces for windshield incident angles near the Brewster angle. If the ghost images are dim enough, they do not diminish HUD image legibility, even if they are displaced angularly from the main image. However, there is a limited range of incident angles within which ghost brightness reduction alone is sufficient to maintain HUD image legibility. For large field-of-view HUDs and/or non-optimal windshield rake angles, the incident angles further from the Brewster angle may produce P-pol reflections from the glass-air interfaces that are bright enough to reduce image legibility. While the addition of an anti-reflective coating to one or both of the windshield glass surfaces may reduce the ghost brightness, it would be expensive and reduce windshield surface durability.

According to some aspects of the present description, methods and systems for creating a single, standardized (i.e., non-customized) windshield wedge profile are provided which may be combined with a weak reflective polarizer to provide an improved virtual image (e.g., reduced ghosting) over a larger range of viewing angles, and which may be used with windshields of various rake and skew angles.

According to some aspects of the present description, a heads-up display for viewing by an eye of a passenger of a vehicle includes a windshield including a reflective polarizer and a display. For the purposes of this specification, the term "passenger" shall be used to refer to any occupant of a vehicle, including, but not limited to, the operator or driver of the vehicle. In some embodiments, the reflective polarizer may be disposed between, and spaced apart from, opposing outermost first and second major glass surfaces of the windshield (i.e., "sandwiched" between an interior glass layer of the windshield and an exterior glass layer). In some embodiments, the reflective polarizer may be embedded in the windshield. For substantially normally incident light and for at least a first wavelength in a visible wavelength range extending from about 420 nm to about 680 nm, the reflective polarizer may reflect at least 15% of the incident light having a first polarization state (e.g., light with a linear P polarization type, or P-pol light), and may transmit at least 60% of the incident light having an orthogonal, second polarization state (e.g., light with a linear S polarization type, or S-pol light). The use of P-pol and S-pol polarization types is used as one possible example and is not intended to be limiting in any way. Other polarization states may be used in alternate embodiments.

In some embodiments, the display may be a liquid crystal display (LCD), an organic light emitting display (OLED), a digital light processing (DLP) display, or any other appropriate picture generating unit. In some embodiments, the display may include an active display region with a maximum lateral dimension D (e.g., the diagonal of a rectangular display), which is configured to emit an image. The heads-up display may form a virtual image of the emitted image for viewing by the eye of the passenger (e.g., an image projected onto a surface of a windshield such that the image—the virtual image—is perceived to be suspended in space somewhere beyond the windshield). In some embodiments, a separation between the virtual image and the eye of the passenger (i.e., the perceived distance between the eye of the viewer and the virtual image) may be at least about 2 meters. In some embodiments, the active display region has a display center and a predetermined region (e.g., a sub-area of the active display region) which includes the display center. In some embodiments, the predetermined region may have a largest lateral dimension d, such that the ratio d/D is less than or equal to about 0.25. Stated another way, the predetermined region is an area smaller than the full active display area, and located in the vicinity of, and including, the center of the active display area.

In some embodiments, the windshield may be configured to receive the image emitted by the active display region and reflect at least a portion of the received image toward the eye of the passenger. For at least one first location within the predetermined region of the active display region, the emitted image may include a first emitted image ray emitted from the first location and incident on the outermost first major glass surface (i.e., an interior, passenger-facing surface) of the windshield at an angle of incidence greater than about 60 degrees (e.g., in a range from about 64 degrees to about 70 degrees) with at least 90% of the incident first emitted image ray polarized in a plane of incidence of the first emitted image ray.

In some embodiments, at least one of the opposing outermost first and second major glass surfaces of the windshield may make a wedge angle with the reflective polarizer between about 0.0010 degrees and about 0.0060 degrees. In some embodiments, the wedge angle is such that the overall windshield laminate is thickest near the top edge and thinner near the bottom edge.

According to some aspects of the present description, a windshield of a vehicle includes a reflective polarizer disposed between, and bonded to, first (interior) and second (exterior) glass segments. In some embodiments, the first and second glass segments have respective average thicknesses t1 and t2, such that t2 is greater than or equal to t1. In some embodiments, each of the first and second glass segments include opposing inner and outer glass interfaces, where the inner interfaces (e.g., the interfaces between each glass segment and another, different material) of the first and second glass segments face the reflective polarizer. In some embodiments, the outer glass interfaces of the first and second glass segments may face away from the reflective polarizer and make respective angles θ1 and θ2 with the reflective polarizer, where at least one of θ1 and θ2 have a value between about 0.0010 and about 0.0060 degrees. In other words, the outer glass interfaces may be so angled relative to the embedded reflective polarizer so as to create a slight wedge shape in the cross-sectional profile of the windshield laminate.

According to some aspects of the present description, a heads-up display for forming a virtual image for viewing by an eye of a passenger of a vehicle includes a glass windshield and a display. In some embodiments, the glass windshield includes opposing outermost first and second glass interfaces (i.e., interfaces between the windshield and another, different material, such as air), and a reflective polarizer embedded therein and spaced apart from the outermost first and second glass interfaces. For substantially normally incident light, and for at least a first wavelength in a visible wavelength range extending from about 420 nm to about 680 nm, the reflective polarizer reflects at least 15% of the incident light having a first polarization state (e.g., P-pol light), and transmits at least 60% of the incident light having an orthogonal, second polarization state (e.g., S-pol light). In some embodiments, the display may be positioned closer to the first glass interface and farther from the second glass interface (i.e., closer to an interior surface of the windshield, disposed within the vehicle), and may include an active display region configured to emit an image. In some embodiments, at least first and second emitted image rays, which are angularly spaced apart by a first angle and emitted in a same emission plane from a same location in the active display region, may be incident on the windshield in a same incident plane coincident with the emission plane at incident angles greater than about 60 degrees, and may be reflected by the windshield as at least respective first and second reflected image rays angularly spaced apart by a second angle, the first and second reflected image rays incident on the eye of the passenger with the second angle being less than the first angle by at least 20%. Stated another way, in some embodiments, the windshield may be configured such that the angle (i.e., second angle) between the first and second reflected image rays (as seen by the eye of the passenger) is less than the angle (i.e., first angle) between the first and second emitted image rays. In some embodiments, the second angle is such that the first and second reflected image rays are substantially coincident.

In some embodiments, at least a third emitted image ray may be angularly spaced apart from the first and second emitted image rays by respective third and fourth angles, and emitted in the emission plane from the same location in the active display region. The third emitted image ray is incident on the windshield in the incident plane coincident with the emission plan at an incidence angle greater than about 60 degrees, and is reflected by the windshield as a third reflected image ray angularly spaced apart from the first and second reflected image rays by respective first and sixth angles, such that the third reflected image ray is incident on the eye of the passenger with the fifth and sixth angles being less than the respected third and fourth angles by at least 20%. Stated another way, in some embodiments, the windshield may be configured such that the angles among the first, second, and third reflected image rays (as seen by the eye of the passenger) are each less than the angles among the first, second, and third emitted image rays. In some embodiments, the fifth and sixth angles are such that the first, second, and third reflected image rays are substantially coincident.

According to some aspects of the present description, an optical stack for use in a windshield of a vehicle includes a reflective polarizer disposed between first and second polymeric films. In some embodiments, each of the first and second polymeric films may include a first major surface facing, and bonded to, the reflective polarizer, and an opposing second major surface facing away from the reflective polarizer, such that the second major surfaces of the first and second polymeric films make respective angles ω1 and ω2 with the reflective polarizer, where at least one of ω1 and ω2 having a value between about 0.0010 and about 0.0060 degrees. Stated another way, each of the second major surfaces (opposite the reflective polarizer) of the first and second polymeric films may be angled with respect to the reflective polarizer such that the optical stack has a wedged cross-sectional profile. In some embodiments, at least one of the first and second polymeric films may comprise polyvinyl butyral (PVB). In some embodiments, angles ω1 and ω2 may be substantially identical. In some embodiments, angles ω1 and ω2 may be different. In some embodiments, the first and second polymeric films may have different average thicknesses.

In some embodiments, the optical stack may be disposed between, and bonded to, first and second glass segments (i.e., glass layers) such that the second major surfaces of the first and second polymeric films face, and are bonded to, the respective first and second glass statements. In some embodiments, the first and second glass segments may have a substantially flat rectangular cross-sectional profile (that is, little to no wedge). In some embodiments, at least one of the first and second glass segments may have a wedge-shaped cross-sectional profile. In some embodiments, the first and second glass segments may have substantially identical average thicknesses. In some embodiments, the first and second glass segments may have different average thicknesses. In some embodiments, there may be a separation between the second major surfaces of the first and second polymeric films at the bottom of the windshield that is less than a separation between the second major surfaces of the first and second polymeric films at the top of the windshield. In other words, the configuration of the polymeric films and/or the reflective polarizer may be such that the profile of the windshield is substantially wedge-shaped, with the top of the optical stack being thicker than the bottom.

According to some aspects of the present description, a windshield for use in a heads-up display (HUD) of a vehicle is assembled to the vehicle, such that the HUD is configured to form a virtual image of an image emitted by a display of the HUD for viewing by an eye of a passenger of the vehicle. In some embodiments, there may be a separation between the virtual image and the eye of the passenger between about 2 meters and about 16 meters. For each image ray emitted from a central region of the display and incident on the windshield at an incident angle between about 64 degrees to about 70 degrees, the emitted image ray may be reflected by outermost first and second surfaces of the windshield as respective first and second reflected image rays propagating toward the eye of the passenger and making an angle therebetween, such that an angle between the first and second surfaces is chosen (e.g., designed) so that the angle between the first and second reflected image rays is less than about 0.04 degrees for any ray forming a virtual image at a distance between about 2 and 16 meters.

In some embodiments, the windshield may have an average thickness of less than about 10 mm, or less than about 8 mm, or less than about 6 mm, or less than about 5 mm. In some embodiments, the angle between the outermost first and second surfaces of the windshield is between about 0.004 and 0.01 degrees. In some embodiments, the separation between the virtual image and the eye of the passenger may be between about 2 meters to about 4 meters, and angle between the outermost first and second surfaces of the windshield may be about 0.01 degrees.

Turning now to the figures, FIG. 1A is a cut-away, side view of a heads-up display, according to the present description. Heads-up display (HUD) 300 includes a display 40, and a windshield 10. Display 40 is configured to emit an image (emitted image 50), at least a portion of which may be reflected from windshield 10 toward the eye of a passenger 310 (e.g., the driver) as reflected image 52. Passenger 310 may then perceive the reflected image 52 as virtual image 51, which is perceived by passenger 310 to be at some separation distance S from passenger 310 (e.g., perceived to be superimposed over the road or terrain visible to passenger 310 through windshield 10).

In some embodiments, windshield 10 may include reflective polarizer 20 disposed between, and spaced apart from, opposing first outermost major glass surface 11 (e.g., windshield surface inside the vehicle, facing the driver) and second outermost major glass surface 12 (e.g., windshield surface, outside the vehicle facing away from driver). In some embodiments, first outermost major glass surface 11 may be an outer glass interface of a first glass segment 13, and second outermost major glass surface 12 may be an outer glass interface of a second glass segment. In addition, first glass segment 13 may have a first innermost glass surface 13a, and second glass segment 14 may have a second innermost glass surface 14a, and reflective polarizer 20 may be disposed between, and bonded to, the first glass segment 13 at the first innermost glass surface 13a and second glass segment 14 at the second innermost glass surface 14a. In some embodiments, first glass segment 13 may have an average thickness, t1, and second glass segment 14 may have an average thickness, t2, such that t2 is greater than or equal to t1.

In some embodiments, the first outermost major glass surface 11 of first glass segment 13 may be at an angle, θ1, with respect to the surface of reflective polarizer 20 (i.e., with first innermost glass surface 13a). In some embodiments, the second outermost major glass surface 12 may be at an angle, θ2, with respect to the surface of reflective polarizer 20 (i.e., with second innermost glass surface 14a). In some embodiments, at least one of θ1 and θ2 may have a value between about 0.0010 and about 0.0060 degrees. In some embodiments, θ1 and θ2 may be the same angle. In some embodiments, θ1 and θ2 may be different angles. Angles θ1 and θ2 may be chosen such that the windshield 10 has an overall wedge angle θw, such that the angular displacement between image rays from a reflected main image and image rays from a reflected ghost image may be reduced. In some embodiments, the reduction in angular displacement between main image rays and ghost image rays may be combined with reflective polarizer 20 to enable a single (i.e., non-customized) windshield wedge configuration to be used across a range of windshield and vehicle geometries. Stated another way, combining the benefits of a wedged window profile with a reflective polarizer may reduce image ghosting for at least a portion of different operational scenarios (i.e., scenarios defined by viewing angles, passenger height and position, distance to windshield, distance to virtual image, etc.) without requiring a new windshield wedge configuration for every different operational scenario.

In some embodiments, first glass segment 13 may have a single-layer construction such that the wedge-shaped profile (i.e., angle θ1) is created by the shape of the glass itself (i.e., the glass layer is thicker near one edge than the other). In some embodiments, it may be advantageous for first glass segment 13 to have a multi-layer construction, where the wedge shape is formed by an inner layer 13p placed adjacent and adhered to an outer, substantially flat glass layer 13g. Similarly, in some embodiments, second glass segment 14 may have a multi-layer construction, with the wedge shape formed by an inner layer 14p and an outer, substantially flat glass layer 14g.

In some embodiments, inner layers 13p and 14p may be a polymeric film. In some embodiments, the inner layers 13p and 14p may comprise polyvinyl butyral (PVB), polyurethane, polyolefins, acrylates, or any other appropriate material. For example, in some embodiments, polyvinyl butyral (PVB) may be used in the manufacture of safety glass for the auto industrial in applications such as windshields. In some embodiments, two glass sheets (e.g., layers 13g and 14g) may be combined with an interlayer of PVB (e.g., layers 13p and 14p), each with given thickness, compositions, and properties. In some embodiments, a reflective polarizer 20 may be included in the layers, as described elsewhere herein. This layered combination may be processed through an autoclave cycle consisting of high temperature and pressure (e.g., a range of 8-10 atmospheres, at 120-140 degrees C. for a duration between 30 minutes and over 2 hours). In some embodiments, the PVB film may be constructed with a wedge shape in the windshield (e.g., for heads-up-display applications, as described herein). The wedge type PVB may be manufactured via a process of melt extrusion including a plasticizer using a die with an appropriate wedge profile to create appropriate wedge dimensions in the final product. This process is an example process only, and not intended to be limiting in any way. Any appropriate method of making a wedge profile in the windshield may be used, including the use of wedge-shaped inner layers (e.g., PVB), wedge-shaped reflective polarizers, one or more wedge-shaped glass segments, or a combination thereof.

Figure 1B:
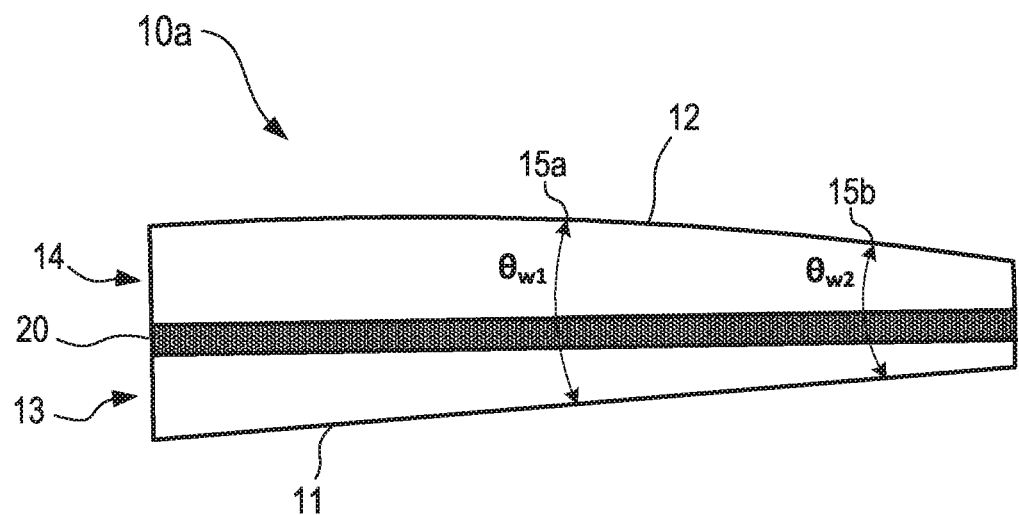
FIGS. 1B and 1C illustrate various windshield profile shapes, in accordance with an embodiment of the present description.
Figure 1C:
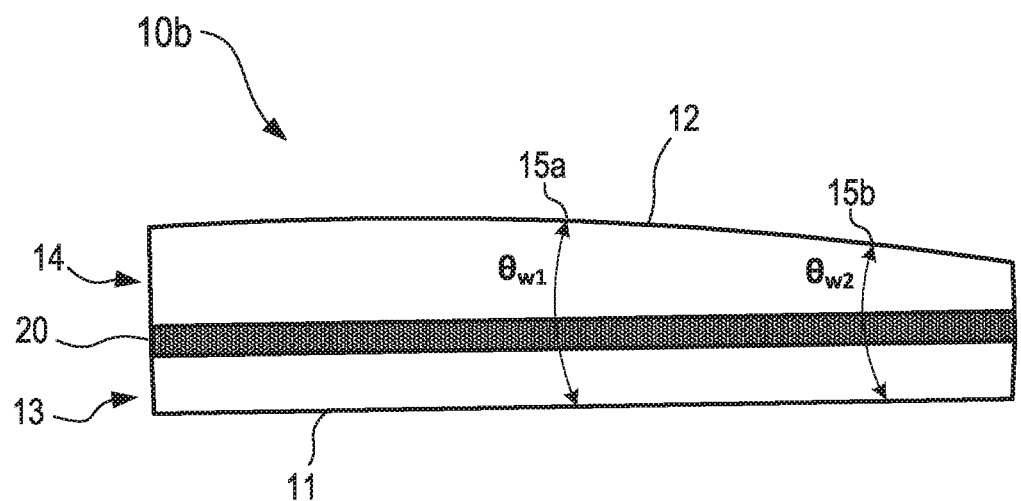

In some embodiments, the wedge angle θw between the first outermost major glass surface 11 and second outermost major glass surface 12 may vary depending on the location of incidence of incoming image rays (i.e., one or both of outermost major glass surfaces 11 and 12 may be curved.) FIGS. 1B and 1C show alternate embodiments of a windshield where the wedge angle varies based on the location of incidence. In FIG. 1B, second outermost major glass surface 12 is curved such that the wedge angle θw1 at location 15a may be different than wedge angle θw2 at location 15b. In other embodiments, first outermost major glass surface 11 may alternately or additionally be curved. In the embodiment of FIG. 1C, second outermost major glass surface 12 is curved and first outermost major glass surface 11 is substantially straight (i.e., flat). Other relationships between outermost major glass surfaces 11 and 12 (i.e., other wedge profiles) may exist within the spirit of the present disclosure.

In some embodiments, reflective polarizer 20 may, for substantially normally incident light and for at least one wavelength in a visible wavelength range extending from about 420 nm to about 680 nm, reflect at least 15%, or at least 20%, or at least 30%, of the incident light with a first polarization (e.g., light with a P polarization type, or P-pol light), and transmit (i.e., allow to pass) at least 60%, or at least 70%, or at least 80%, of the incident light with a second polarization (e.g., light with an S polarization type, or S-pol light). In other words, in some embodiments, reflective polarizer 20 may be a weak reflector for light of the first polarization state.

Figure 2:
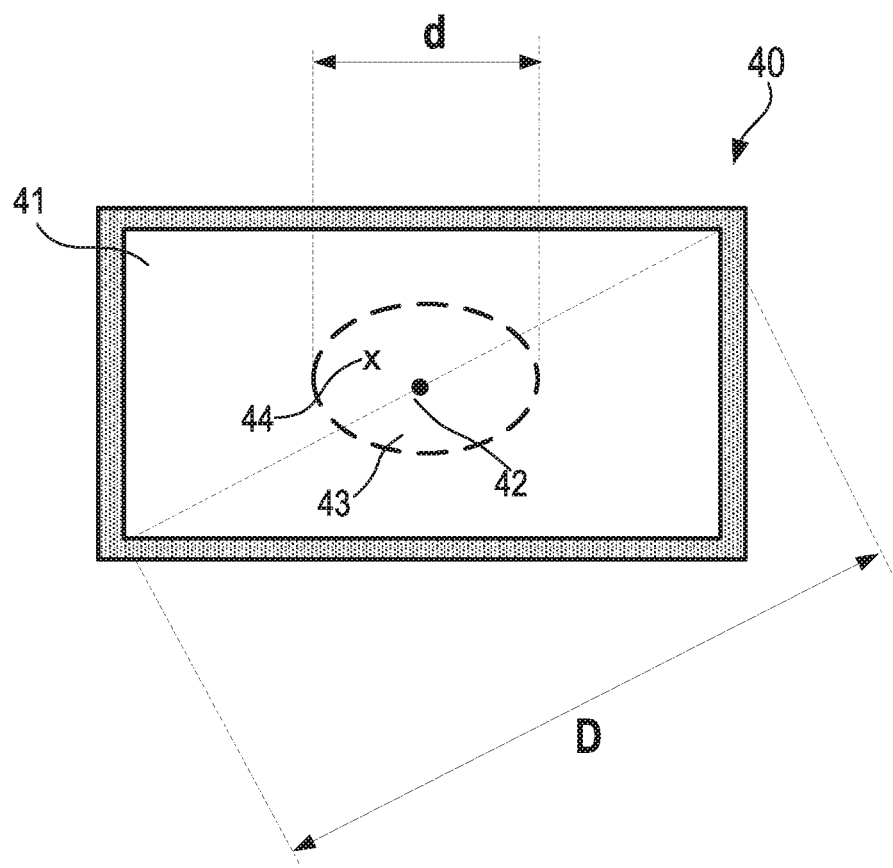
FIG. 2 is a front-view for a display for a heads-up display, in accordance with an embodiment of the present description.

Looking now at FIGS. 1A and 2 together, in some embodiments, display 40 may include an active display region 41 which is configured to emit emitted image 50. In some embodiments, emitted image 50 may include first emitted image ray 53, second emitted image ray 55, and third emitted image 56, emitted in the same emission plane (e.g., the x-z plane shown in FIG. 1A) substantially from the same location 44. In some embodiments, first emitted image ray 53 may be emitted at an angle α1 with respect to second emitted image ray 55. First emitted image ray 53 and second emitted image ray 55 may be incident on windshield 10 in the same incident plane (e.g., the x-z plane of FIG. 1A) with respective angles of incidence β1 and β2. In some embodiments, β1 and β2 may be greater than about 60 degrees. First emitted image ray 53 may be reflected by windshield 10 as first reflected image ray 53a, and second emitted image ray 55 may be reflected by windshield 10 as second reflected image ray 55a. In some embodiments, first reflected image ray 53a and second reflected image ray 56a may be angularly spaced apart by a second angle α2, such that the second angle α2 is less than first angle α1 (e.g., by less than about 25%, or less than about 20%, or less than about 15%). Stated another way, angles θ1 and θ2 may be chosen such that the angle between reflected image rays 53a and 55a is reduced from the angle between emitted image rays 53 and 55. In some embodiments, first reflected image ray 53a and second reflected image ray 55a may be coincident.

Similar to the above discussion, third emitted image ray 56 may be angularly spaced apart from first emitted image ray 53 by third angle α3, and from second emitted image ray 55 by fourth angle α4. Third emitted image ray 56 may be incident on windshield 10 in the incident play (x-z plane) at an incident angle β3, where β3 is greater than about 60 degrees. In some embodiments, third emitted image ray 56 may be reflected from windshield 10 as third reflected image ray 55a, such that first reflected image ray 53a is angularly spaced apart from third reflected image ray 56a by fifth angle α5, and second reflected image ray 55a is angularly spaced apart from third reflected image ray 56a by sixth angle α6, where fifth angle α5 and sixth angle α6 are less than respective third angle α3 and fourth angle α4. In some embodiments, the first reflected image ray 53a, second reflected image ray 55a, and third reflected image ray 56a may be coincident.

It should be noted that each of the first emitted image ray 53, second emitted image ray 55, and third emitted image ray 56 may be reflected from different surfaces of windshield 10. For example, as shown in FIG. 1A, first emitted image ray 53 is reflected from reflective polarizer 20, second emitted image ray 55 is reflected from first outermost major glass surface 11 of first glass segment 13, and third emitted image ray 56 is reflected from the inside of second outermost major glass surface 12 of second glass segment 14.

FIG. 2 provides a front-view for display 40 (looking at active display region 41) for the heads-up display 300 of FIG. 1A, and may be examined simultaneously with FIG. 1A for the following discussion. Display 40 has an active display region 41 configured to emit an image 50 (e.g., an image defining information for display to a passenger on a HUD). The active display region 41 has a maximum lateral dimension D, and defines a predetermined central region 43 including a display center 42 and first location 44 (i.e., the emission location of first emitted image ray 53, second emitted image ray 55, and third emitted image 56 from the discussion of FIG. 1A). Predetermined central region 43 has a maximum lateral dimension d such that the ratio d/D is less than about 0.25.

Figure 3:
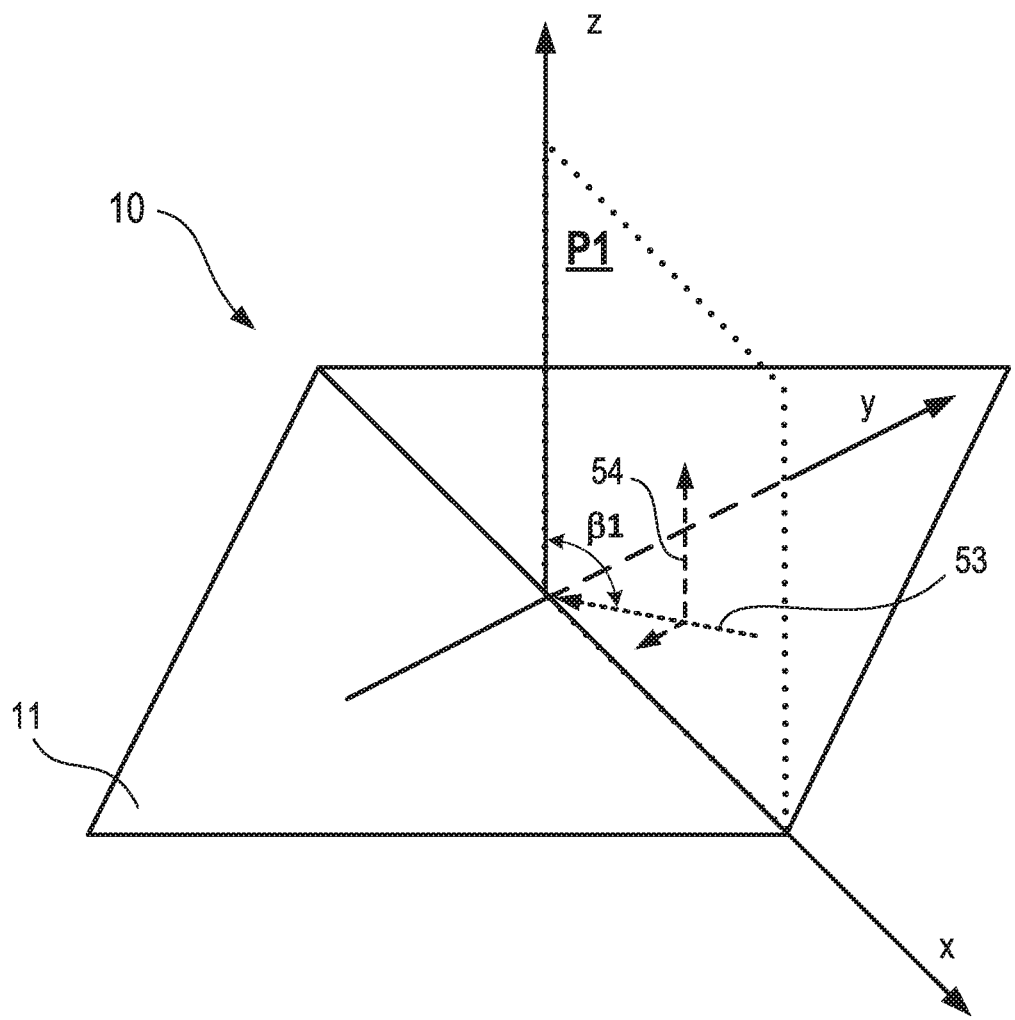
FIG. 3 illustrates the interactions of image rays with a windshield in a heads-up display, in accordance with an embodiment of the present description.

FIG. 3 provides additional details on the interactions of image rays with windshield 10 of FIG. 1A. In some embodiments, first emitted image ray 53 (for example) is incident on first outermost major glass surface 11 of window 10 at angle of incidence β1, where β1 is greater than about 60 degrees. In some embodiments, at least 90%, or at least 95%, of first emitted image ray 53 is polarized in the plane of incidence P1 of the first emitted image ray 53 (shown in FIG. 3 as ray portion 54). Stated another way, first emitted image ray 53 is substantially polarized in the plane of incidence P1.

Figure 4:
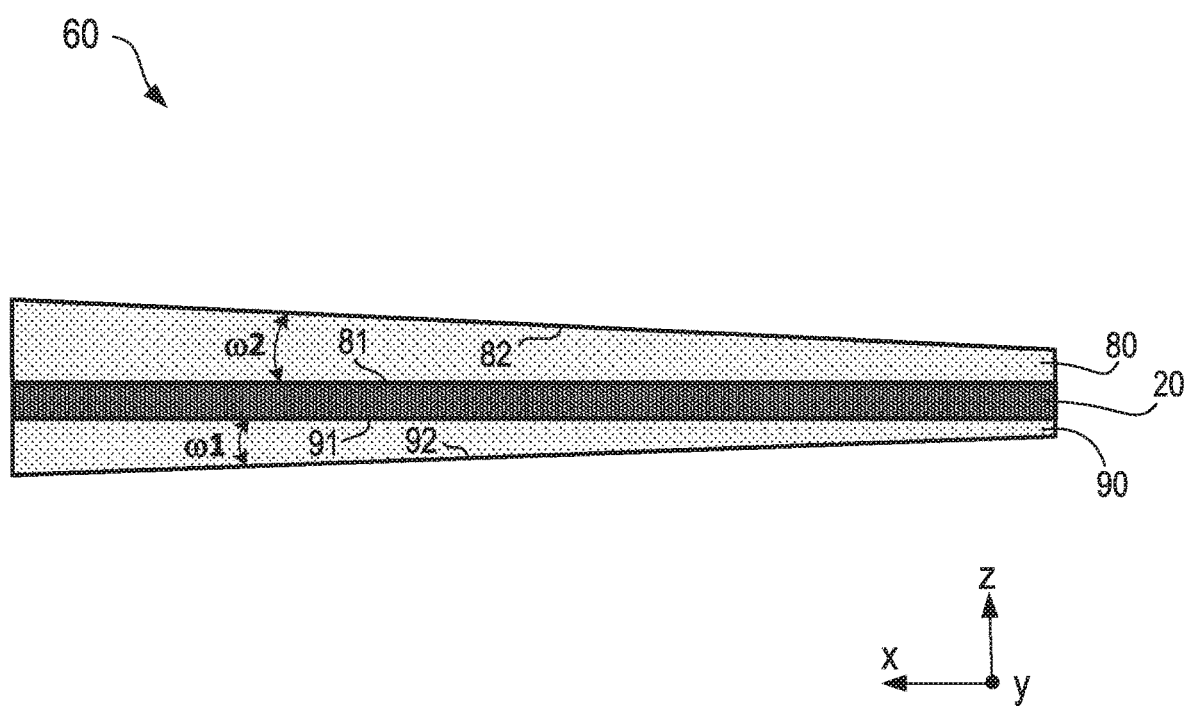
FIG. 4 is a cut-away, side view of an optical stack for a heads-up display, in accordance with an embodiment of the present description.
Figure 5:
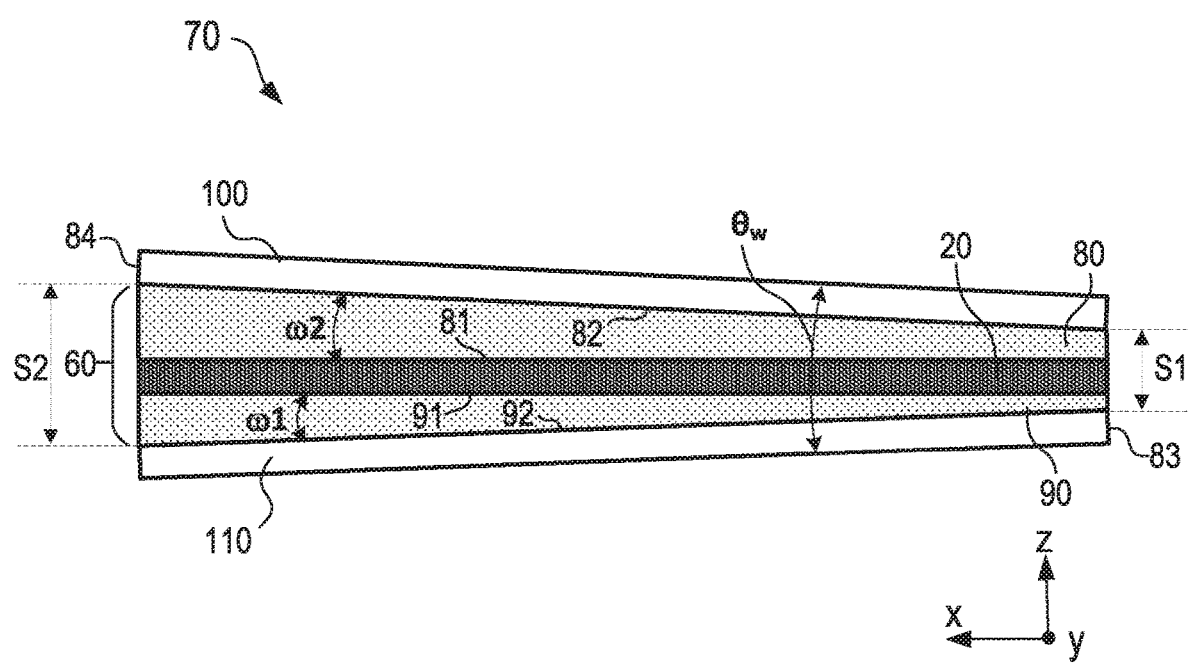
FIG. 5 is a cut-away side view of a windshield for a heads-up display, in accordance with an embodiment of the present description.

In some embodiments, the wedge angle needed for the windshield in the present description may be created using an optical stack embedded within a layered windshield, where one or more layers of the optical stack are angled so as to create the required wedge angle. FIGS. 4 and 5 provide cut-away, side views of an embodiment of an optical stack (e.g., for use in a layered windshield) for a heads-up display, according to the present description. FIGS. 4 and 5 may be examined simultaneously for the following discussion. FIG. 4 illustrates optical stack 60 which may, in some embodiments, be used in windshield 70 (FIG. 5). In some embodiments, optical stack 60 includes a reflective polarizer 20 disposed between a first polymeric film 80 and a second polymeric film 90. Polymeric film 80 includes a first major surface 81 (facing, and bonded to, reflective polarizer 20) and an opposing second major surface 82, facing away from reflective polarizer 20. Polymeric film 90 includes a first major surface 91 (facing, and bonded to, reflective polarizer 20) and an opposing second major surface 92, facing away from reflective polarizer 20. In some embodiments, second major surface 82 of polymeric film 80 makes an angle ω2 with reflective polarizer 20, and second major surface 92 of polymeric film 90 makes an angle ω1 with reflective polarizer 20, such that at least one of ω1 and ω2 have a value between about 0.0010 and about 0.0060 degrees. In some embodiments, ω1 and ω2 may have different values. In some embodiments, ω1 and ω2 may have substantially the same value. One example of a material used in the first polymeric film 80 and second polymeric film 90 is polyvinyl butyral (PVB), although any appropriate polymeric material may be used. In some embodiments, each of the first polymeric film 80 and second polymeric film 90 may have different average thicknesses. In some embodiments, each of the first polymeric film 80 and second polymeric film 90 may have substantially identical average thicknesses.

Turning now to FIG. 5, optical stack 60 (as detailed in FIG. 4) may be disposed between, and bonded to, a first glass segment 100 and a second glass segment 110. That is, first major surface 81 of polymeric film 80 may be bonded to first glass segment 100, and first major surface 91 of polymeric film 90 may be bonded to second glass segment 110. In some embodiments, one or both of first glass segment 100 and second glass segment 110 may be wedged. In some embodiments, one or both of first glass segment 100 and second glass segment 110 may be substantially flat, and the wedge angle $\theta_w$, required for windshield 70 may be provided primarily by angles ω1 and ω2 in each of the first 80 and second 90 polymeric films. In some embodiments, a separation S1 between second major surface 82 of polymeric film 80 and second major surface 92 of polymeric film 90 may be less at one edge of windshield 70 (e.g., a bottom edge) than at an opposing edge (e.g., an opposing top edge).

Terms such as "about" will be understood in the context in which they are used and described in the present description by one of ordinary skill in the art. If the use of "about" as applied to quantities expressing feature sizes, amounts, and physical properties is not otherwise clear to one of ordinary skill in the art in the context in which it is used and described in the present description, "about" will be understood to mean within 10 percent of the specified value. A quantity given as about a specified value can be precisely the specified value. For example, if it is not otherwise clear to one of ordinary skill in the art in the context in which it is used and described in the present description, a quantity having a value of about 1, means that the quantity has a value between 0.9 and 1.1, and that the value could be 1.

Terms such as "substantially" will be understood in the context in which they are used and described in the present description by one of ordinary skill in the art. If the use of "substantially equal" is not otherwise clear to one of ordinary skill in the art in the context in which it is used and described in the present description, "substantially equal" will mean about equal where about is as described above. If the use of "substantially parallel" is not otherwise clear to one of ordinary skill in the art in the context in which it is used and described in the present description, "substantially parallel" will mean within 30 degrees of parallel. Directions or surfaces described as substantially parallel to one another may, in some embodiments, be within 20 degrees, or within 10 degrees of parallel, or may be parallel or nominally parallel. If the use of "substantially aligned" is not otherwise clear to one of ordinary skill in the art in the context in which it is used and described in the present description, "substantially aligned" will mean aligned to within 20% of a width of the objects being aligned. Objects described as substantially aligned may, in some embodiments, be aligned to within 10% or to within 5% of a width of the objects being aligned.

All references, patents, and patent applications referenced in the foregoing are hereby incorporated herein by reference in their entirety in a consistent manner. In the event of inconsistencies or contradictions between portions of the incorporated references and this application, the information in the preceding description shall control.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A heads-up display for viewing by an eye of a passenger of a vehicle, comprising:
    a windshield comprising a reflective polarizer disposed between, and spaced apart from, opposing outermost first and second major glass surfaces of the windshield, such that for substantially normally incident light and for at least a first wavelength in a visible wavelength range extending from about 420 nm to about 680 nm, the reflective polarizer reflects at least 15% of the incident light having a first polarization state, and transmits at least 60% of the incident light having an orthogonal second polarization state; and
    a display comprising an active display region having a maximum lateral dimension D and configured to emit an image, the heads-up display forming a virtual image of the emitted image for viewing by the eye of the passenger, a separation between the virtual image and the eye of the passenger being at least about 2 meters, the active display region comprising a display center and a predetermined region comprising the display center, the predetermined region comprising a largest lateral dimension d, d/D≤0.25;
    the windshield configured to receive the image emitted by the active display region and reflect at least a portion of the received image toward the eye of the passenger, such that for at least one first location within the predetermined region of the active display region, the emitted image comprises a first emitted image ray emitted from the first location and incident on the outermost first major glass surface of the windshield at an angle of incidence greater than about 60 degrees with at least 90% of the incident first emitted image ray polarized in a plane of incidence of the first emitted image ray.

2. The heads-up display of claim 1, wherein the passenger is a driver of the vehicle.

3. The heads-up display of claim 1, wherein at least one of the opposing outermost first and second major glass surfaces of the windshield make a wedge angle with the reflective polarizer between about 0.0010 and 0.0060 degrees.

4. The heads-up display of claim 1, wherein the reflective polarizer is embedded in the windshield.

5. A heads-up display for forming a virtual image for viewing by an eye of a passenger of a vehicle, comprising:

a glass windshield comprising opposing outermost first and second glass interfaces and a reflective polarizer embedded therein and spaced apart from the outermost first and second glass interfaces, such that for substantially normally incident light and for at least a first wavelength in a visible wavelength range extending from about 420 nm to about 680 nm, the reflective polarizer reflects at least 15% of the incident light having a first polarization state, and transmits at least 60% of the incident light having an orthogonal second polarization state; and a display positioned closer to the first glass interface and farther from the second glass interface and comprising an active display region configured to emit an image, such that at least first and second emitted image rays, angularly spaced apart by a first angle and emitted in a same emission plane from a same location in the active display region, are incident on the windshield in a same incident plane coincident with the emission plane at incident angles greater than about 60 degrees, are reflected by the windshield as at least respective first and second reflected image rays angularly spaced apart by a second angle, the first and second reflected image rays incident on the eye of the passenger with the second angle being less than the first angle by at least 20%.

6. The heads-up display of claim 5, wherein the first and second reflected image rays are coincident.

7. The heads-up display of claim 5, wherein at least a third emitted image ray, angularly spaced apart from the first and second emitted image rays by respective third and fourth angles and emitted in the emission plane from the same location in the active display region, is incident on the windshield in the incident plane coincident with the emission plane at an incident angle greater than about 60 degrees, is reflected by the windshield as a third reflected image ray angularly spaced apart from the first and second reflected image rays by respective fifth and sixth angles, the third reflected image ray incident on the eye of the passenger with the fifth and sixth angles being less than the respective third and fourth angles by at least 20%.

8. The heads up display of claim 7, wherein the first, second, and third reflected image rays are coincident.

9. A windshield for use in a heads up display (HUD) of a vehicle, such that when the windshield is assembled to the vehicle, the HUD is configured to form a virtual image of an image emitted by a display of the HUD for viewing by an eye of a passenger of the vehicle with a separation between the virtual image and the eye of the passenger being between about 2 meters to about 16 meters, wherein for each image ray emitted from a central region of the display and incident on a first location of the windshield at an incident angle between about 64 degrees to about 70 degrees, the emitted image ray is reflected by outermost first and second surfaces of the windshield as respective first and second reflected image rays propagating toward the eye of the passenger and making a first angle therebetween, such that a wedge angle between the first and second surfaces at the first location is chosen so that the wedge angle is less than about 0.04 degrees.

10. The windshield of claim 9, wherein the wedge angle between the first and second surfaces varies with the first location.

11. The windshield of claim 9, wherein the wedge angle between the first and second surfaces is different for at least two different first locations of the windshield.

12. The windshield of claim 9, having an average thickness less than about 10 mm.

13. The windshield of claim 9, having an average thickness less than about 8 mm.

14. The windshield of claim 9, having an average thickness less than about 6 mm.

15. The windshield of claim 9, having an average thickness less than about 5 mm.

16. The windshield of claim 9, wherein the wedge angle is between about 0.004 and 0.01 degrees.

17. The windshield of claim 9, wherein the separation is between about 2 meters to about 4 meters, and the wedge angle is about 0.01 degrees.

* * * * *